US012546898B2

(12) United States Patent
Morton et al.

(10) Patent No.: US 12,546,898 B2
(45) Date of Patent: Feb. 10, 2026

(54) SATELLITE SIGNAL SPOOF DETECTION USING TIME-DIFFERENCED CARRIER PHASE COMPUTED ACCELERATION MEETING INTEGRITY CRITERIA

(71) Applicant: Honeywell International Inc., Charlotte, NC (US)

(72) Inventors: Blaise G. Morton, Minnetonka, MN (US); Vibhor L. Bageshwar, Rosemount, MN (US)

(73) Assignee: Honeywell International Inc., Charlotte, NC (US)

( * ) Notice: Subject to any disclaimer, the term of this patent is extended or adjusted under 35 U.S.C. 154(b) by 418 days.

(21) Appl. No.: 18/056,618

(22) Filed: Nov. 17, 2022

(65) Prior Publication Data
US 2024/0176028 A1 May 30, 2024

(51) Int. Cl.
G01S 19/21 (2010.01)
(52) U.S. Cl.
CPC .................... G01S 19/215 (2013.01)
(58) Field of Classification Search
CPC .......................................... G01S 19/215
See application file for complete search history.

(56) References Cited

U.S. PATENT DOCUMENTS

| 9,405,012 | B2 | 8/2016 | Doucet et al. | |
|---|---|---|---|---|
| 2011/0181465 | A1* | 7/2011 | Li | G01S 19/33 342/357.73 |

(Continued)

FOREIGN PATENT DOCUMENTS

| CN | 110703284 A | 1/2020 |
|---|---|---|
| EP | 2395367 A1 | 12/2011 |
| WO | 2021112331 A1 | 6/2021 |

OTHER PUBLICATIONS

European Patent Office, "Communication pursuant to Article 94(3)EPC", dated Dec. 2, 2024, from EP Application No. 232057174.4, from Foreign Counterpart to U.S. Appl. No. 18/056,618, pp. 1 through 4, Published: EP.

(Continued)

*Primary Examiner* — Cassi J Galt
(74) *Attorney, Agent, or Firm* — Fogg & Powers LLC

(57) ABSTRACT

A system to detect spoofing or jamming of GNSS signals comprises a GNSS receiver onboard a vehicle; an onboard INS and an IMU for producing vehicle inertial measurements; and an onboard processor that receives data outputs from the GNSS receiver and INS. The processor performs a method comprising computing a time-averaged GNSS-derived acceleration estimate for the vehicle based on TDCP measurements received from the GNSS receiver; computing a time-averaged INS-derived acceleration estimate for the vehicle based on inertial measurements; producing a time-varying threshold, indicative of a spoofing or jamming event, based on a user-specified probability of false alarm or probability of missed detection; obtaining a difference between the time-averaged GNSS-derived acceleration estimate and the time-averaged INS-derived acceleration estimate; determining whether a magnitude of the difference is greater than the time-varying threshold; and generating a spoofing or jamming alert when the magnitude of the difference is greater than the time-varying threshold.

20 Claims, 7 Drawing Sheets

(56) References Cited

U.S. PATENT DOCUMENTS

| | | | | |
|---|---|---|---|---|
| 2019/0302272 | A1* | 10/2019 | Balog | G01S 19/215 |
| 2020/0348422 | A1 | 11/2020 | Carcanague et al. | |
| 2020/0371247 | A1* | 11/2020 | Marmet | G01S 19/015 |
| 2021/0405213 | A1 | 12/2021 | Tuck et al. | |
| 2022/0283317 | A1* | 9/2022 | Langel | G01S 19/37 |

OTHER PUBLICATIONS

European Patent Office, "Extended European Search Report", dated Apr. 11, 2024, from Application No. 232057174.4, from Foreign Counterpart to U.S. Appl. No. 18/056,618, pp. 1 through 11, Published: EP.

Lee et al. "GPS Spoofing Detection using Accelerometers and Performance Analysis with Probability of Detection", International Journal of Control, Automation, and Systems, Korean Institute of Electrical Engineers, Seoul, KR, vol. 13, No. 4, May 23, 2015, pp. 951 through 959.

Enge et al., "Detection of GPS Spoofing", Working Group 2 of RTCA Special Committee 159, Mar. 12, 2017, pp. 1 through 37, Federal Aviation Administration under MOA-DTFAWA-15-A-80019.

European Space Agency, "Gravity variation GOCE objectives", Earth Online, at least as early as Sep. 21, 2021, pp. 1 through 7, https://earth.esa.int/eogateway/missions/goce/objectives.

Freda, "Time-differenced carrier phases technique for precise GNSS velocity estimation", GPS Solut (2015), Dec. 31, 2014, pp. 1 through 9, Springer-Verlag Berlin Heidelberg.

Gaglione "How does a GNSS receiver estimate velocity?", GNSS Solutions, Mar./Apr. 2015, pp. 1 through 4, InsideGNSS, www.insidegnss.com.

Honeywell, "Laseref VI Product Description", Oct. 2016, pp. 1 through 27, Honeywell.

Lo et al. "The Benefit of Low Cost Accelerometers for GNSS Anti-Spoofing", Proceedings of the ION 2017 Pacific PNT Meeting, May 2017, pp. 1 through 22, Honolulu, Hawaii.

Neish et al., "Uncoupled Accelerometer Based GNSS Spoof Detection for Automobiles using Statistic and Wavelet Based Tests", Proceedings of the 31st International Technical Meeting of the Satellite Division of The Institute of Navigation (ION GNSS+ 2018), Sep. 2018, pp. 2938 through 2962.

Soon et al. "An approach to aid INS using time-differenced GPS carrier phase (TDCP) measurements", GPS Solutions (2008), 12, Jan. 9, 2008, pp. 261 through 271, Springer.

Zhang et al., "GPS Satellite Velocity and Acceleration Determination using the Broadcast Ephemeris", The Journal of Navigation, 59, 2006, pp. 293 through 305, The Royal Institute of Navigation.

* cited by examiner

SATELLITE SIGNAL SPOOF DETECTION USING TIME-DIFFERENCED CARRIER PHASE COMPUTED ACCELERATION MEETING INTEGRITY CRITERIA

BACKGROUND

Signals from a Global Navigation Satellite System (GNSS) constellation, such as the Global Positioning System (GPS), can be spoofed when a radio transmitter is used to send a counterfeit signal to a GPS receiver to counter a legitimate satellite signal. Most navigation systems are designed to use the highest power GPS signal, and the counterfeit signal overrides the weaker power but legitimate satellite signal. A GPS spoofing attack can result in errors in the navigation data relied on by a vehicle using GPS signals for navigation.

Various methods have been developed to detect GPS spoofing events. In such detection methods, quantities such as GPS position, GPS velocity, GPS clock, GPS doppler-velocity, or GPS-derived accelerations have been used with other independent sensors such as inertial sensors to detect GPS spoofing events.

For example, methods that use a GPS-derived acceleration with measurements from inertial sensors to detect GPS spoofing events rely on less accurate techniques such as precise point positioning (PPP) to compute the GPS-derived accelerations, and low grade inertial sensors. Also, these methods do not compute accurate probabilities of error-sizes in the components of GPS-derived acceleration that can be used in spoofing or jamming tests to identify corrupted GPS signals in real time situations, which is particularly needed for military applications.

SUMMARY

A system to detect spoofing or jamming of GNSS signals comprises a GNSS receiver onboard a vehicle; an inertial navigation system (INS) onboard the vehicle; an inertial measurement unit (IMU) operatively coupled to the INS, the IMU operative to produce inertial measurements that are sent to the INS; and at least one processor onboard the vehicle, the processor operative to receive data outputs from the GNSS receiver and the INS. The processor is operative to execute processor readable instructions to perform a spoofing or jamming test comprising providing multiple derived acceleration test methods comprising: a first test method that uses GNSS-derived acceleration estimates and INS-derived acceleration estimates that are computed at a single time epoch; a second test method that uses GNSS-derived acceleration estimates and INS-derived acceleration estimates that are computed at two time epochs; and a third test method that uses GNSS-derived accelerations and INS-derived accelerations that are computed at multiple time epochs, using exponentially averaged accelerations. A time-varying threshold signal is produced that is indicative of a spoofing or jamming event, based on a user-specified probability of false alarm or probability of missed detection, for each of the derived acceleration test methods. A difference signal between the time-averaged GNSS-derived acceleration estimates and the time-averaged INS-derived acceleration estimates is obtained in each of the derived acceleration test methods. A determination is then made whether a magnitude of the difference signal is greater than the time-varying threshold signal in any of the derived acceleration test methods. A spoofing or jamming alert is generated when the magnitude of the difference signal is greater than the time-varying threshold signal in one or more of the derived acceleration test methods.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1A:
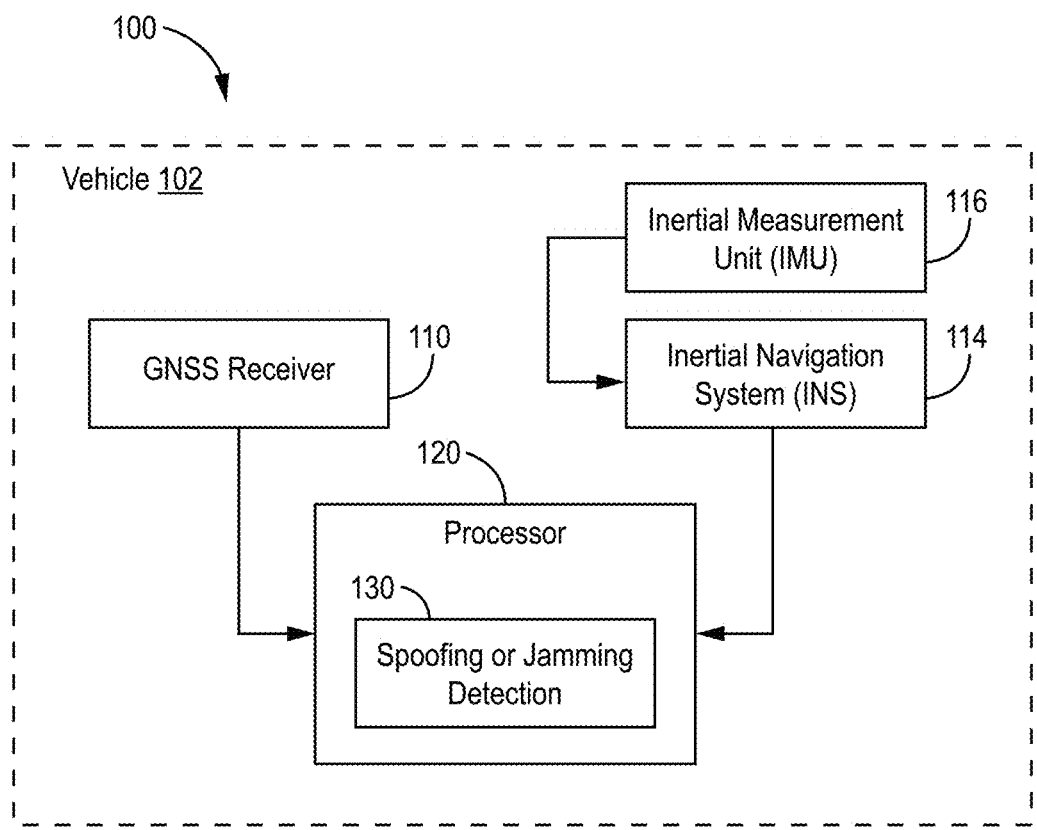
FIG. 1A is a block diagram of a system to detect spoofing or jamming of GNSS signals, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system to detect spoofing or jamming of signals from a GNSS constellation, such as GPS, is described herein. The present method uses time-differenced carrier phase (TDCP) computed GNSS acceleration, or GNSS-derived acceleration, compared with acceleration estimates derived from other sources, to detect spoofing or jamming events.

The present approach provides the ability to detect GNSS spoofing or jamming events using spoofing or jamming tests, whose components are computable in real time. These spoofing or jamming tests are based on GNSS-derived acceleration, INS-derived acceleration, and user-selected thresholds. The GNSS-derived acceleration is computed using TDCP in a way that accounts for the varying noise levels in the received GNSS signals due to time-varying satellite geometry. The thresholds are based on the probability of false alarm (PFA) or probability of missed detection (PMD) and their selection assures that the spoofing or jamming detection system meets a user-specified level of integrity.

The present method is particularly useful in aircraft navigation systems, as it provides thresholds based on integrity requirements such as the PFA or PMD. In one implementation, the present system uses spoofing tests based on GPS-derived acceleration using TDCP, compared with acceleration derived from an inertial navigation system (INS) on an aircraft, to detect GPS spoofing. This approach provides higher levels of integrity for the GPS aided INS systems used on the aircraft.

An INS is configured to produce fast, accurate three-dimensional acceleration estimates of the aircraft from inertial sensor measurements that are independent of the GPS signals. The carrier phase measurement of the GPS signals can be processed (over multiple measurement epochs) to obtain another estimate of aircraft acceleration, provided that at least four different satellite signals are being received by the GPS receiver for two consecutive measurement epochs (an example GPS measurement epoch is 1 Hz). The estimates of average vehicle velocity from the GPS carrier phase measurements can be computed using TDCP, which requires carrier phase measurements at two consecutive epochs to estimate average aircraft velocity. Two consecutive estimates of average aircraft velocity can be used to estimate average aircraft acceleration over the time period of the average aircraft velocity estimates.

The spoofing test compares the difference between the GNSS-derived acceleration and the INS-derived acceleration to compute a difference signal $s(k)$ (where k is the measurement epoch). The difference signal $s(k)$ can be compared to a user-specified threshold and will be close to 0 with high probability, over time, provided the GPS signals are not being spoofed. The user-specified threshold, $T(k)$, can be computed taking into account the GPS accuracy, inertial sensor accuracy, and the specified PFA or PMD rate. The result is a time-varying threshold signal $T(k)$ and spoofing and jamming test that indicates GPS spoofing when the magnitude $|s(k)|$ is greater than $T(k)$, with a false alarm rate less than the PFA or a missed detection rate less than the PMD.

The advantage of using GNSS-derived acceleration in the present spoof detection method, compared to prior spoof detection methods, is that it is more difficult for a spoofer to track a target aircraft's acceleration in real time to avoid detection because a spoofer does not know when the aircraft will maneuver or accelerate when reacting to wind gusts or turbulence during flight. During a period of spoofing, when vehicles experience high-frequency accelerations, the difference between the GNSS-derived acceleration and INS-derived acceleration will exceed the user-specified threshold. The spoofer will be unable to accurately replicate these accelerations on the fake GNSS signals being sent, and, thus, cannot avoid detection by a spoofing test using the GNSS-derived acceleration.

The present approach allows for deriving thresholds that meet a specified PFA and/or PMD. The spoofing tests do not have to be based on data from a single epoch. The TDCP estimated acceleration can also be performed at the carrier phase measurement frequency, which is typically faster than the standard GPS navigation solution measurement frequency. The TDCP estimated acceleration at these faster frequencies are subject to carrier phase noise, however, the effects of the carrier phase noise can be mitigated using an exponential moving average filter. The INS-derived acceleration can also be computed at the same frequency as the filtered GPS-derived acceleration with an exponential average filter. The filtered GPS-derived acceleration and INS-derived acceleration can then be used in the spoofing test.

The benefits of using the TDCP computational method for estimating GPS-derived accelerations are that it allows a real-time computation of the time-varying 1-sigma noise statistics of the estimated acceleration components, and it produces acceleration estimates with lower noise statistics than other methods, such as precise point positioning (PPP) or Doppler methods. These benefits allow extension of the spoofing test to include integrity statistics such as PFA and/or PMD, as well as exponentially weighted moving average tests, because the 1-sigma noise statistics needed for these other tests can be computed and incorporated into the spoofing tests.

With respect to the spoofing test, one of the main limitations on the "tightness" (i.e., narrowness of boundary) of the threshold is the error of the horizontal component of INS-derived acceleration due to vehicle pitch/roll errors.

The present approach provides for testing of GPS spoofing using a spoofing test with tight, accurate thresholds based on the user specified PFA or PMD. As a result, the present approach provides a fast and accurate method to detect GPS spoofing with integrity assurance.

In one embodiment, an aircraft has an onboard INS with navigation-grade inertial sensors, a GPS receiver, and a data processor that has access to the INS and GPS outputs. The accelerometer measurements from the inertial sensors and the carrier-phase measurements from the GPS receiver are processed in such a way as to compute aircraft acceleration statistics to detect GPS spoofing.

In an example method, two consecutive carrier phase measurements are used to compute average aircraft velocity. Two consecutive estimates of average aircraft velocity can be used to estimate average aircraft acceleration over the time period of the average aircraft velocity estimates. Time-varying 1-sigma noise statistics of the GPS-derived acceleration can also be computed for the spoofing test.

Further details related to the present system and method are described as follows and with reference to the drawings.

FIG. 1A illustrates a system 100 to detect spoofing or jamming of GNSS signals, according to one embodiment. The system 100 generally comprises a GNSS receiver 110 located onboard a vehicle 102, such as an aircraft, an inertial navigation system (INS) 114 onboard vehicle 102, and at least one processor 120 onboard vehicle 102. The vehicle 102 can be a manned aircraft, an unmanned aircraft systems (UAS) vehicle, an urban air mobility (UAM) vehicle, or the like.

The GNSS receiver 110 is operative to receive satellite signals from a GNSS constellation, and to generate TDCP measurements. An inertial measurement unit (IMU) 116 is operatively coupled to INS 114. The IMU 116 is operative to produce inertial (accelerometer and gyroscope) measurements that are sent to INS 114. The INS 114 is configured to generate estimated kinematic state statistics for vehicle 102 based on the inertial measurements from IMU 116. The processor 120 is operative to receive data outputs from GNSS receiver 110 and INS 114. The processor 120 hosts a spoofing or jamming detection module 130, which has processor readable instructions to perform a method to detect spoofing or jamming of the satellite signals received by GNSS receiver 110.

Figure 1B:
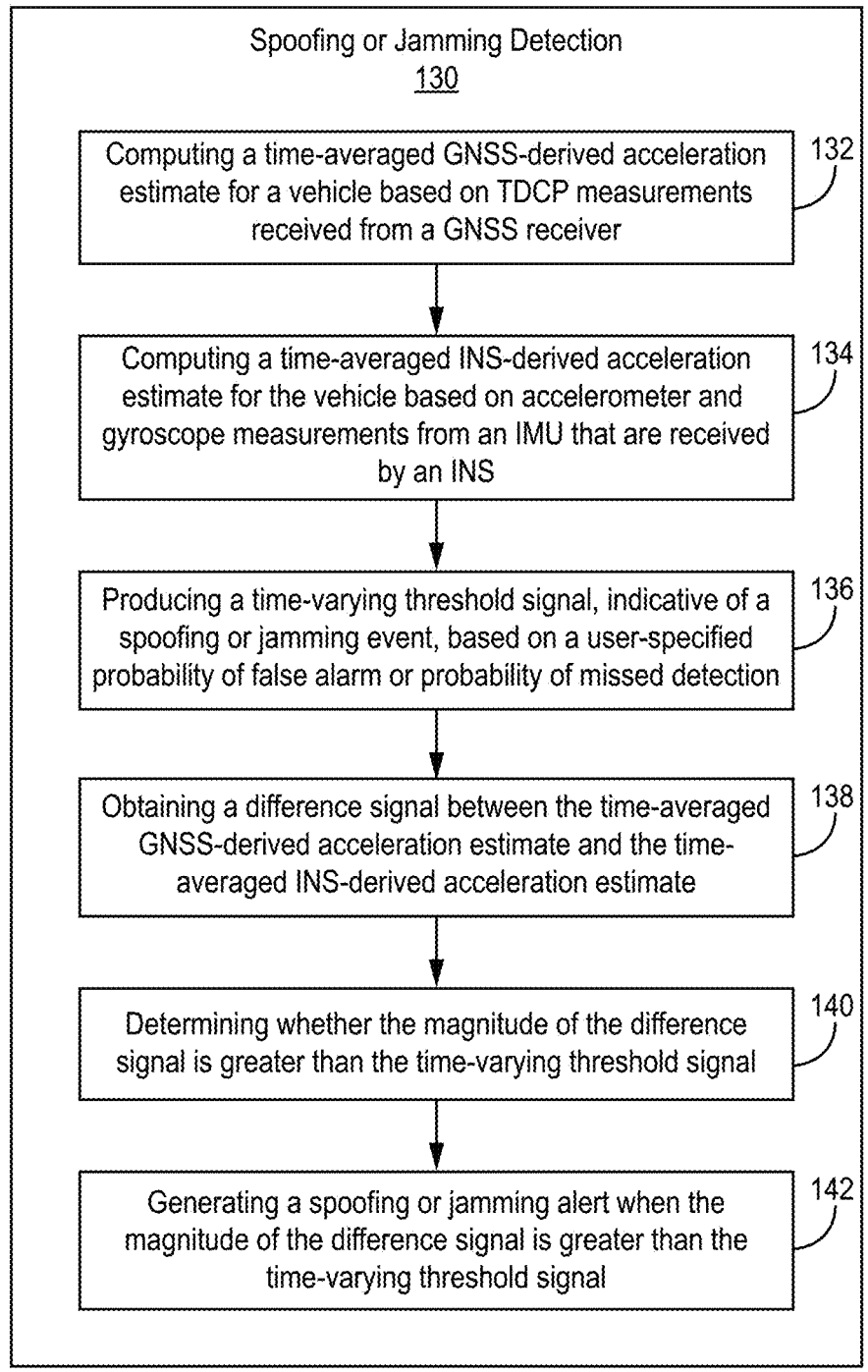
FIG. 1B is a flow diagram of an exemplary method performed by a spoofing or jamming detection module in the system of FIG. 1A.

FIG. 1B is a flow diagram of the method performed by spoofing or jamming detection module 130, according to an exemplary implementation. The method comprises computing a time-averaged GNSS-derived acceleration estimate for vehicle 102 based on TDCP measurements received from GNSS receiver 110 (block 132). The method also includes computing a time-averaged INS-derived acceleration for vehicle 102 based on accelerometer and gyroscope measurements from IMU 116 that are received by INS 114 (block 134). The method then comprises producing a time-varying threshold signal, indicative of a spoofing or jamming event, based on a user-specified probability of false alarm or probability of missed detection (block 136). The method further includes obtaining a difference signal between the time-averaged GNSS-derived acceleration estimate and the time-averaged INS-derived acceleration estimate (block 138), and determining whether the magnitude of the difference signal is greater than the time-varying threshold signal (block 140). The method concludes with generating a spoofing or jamming alert when the magnitude of the difference signal is greater than the time-varying threshold signal (block 142). If the magnitude of the difference signal is less than or equal to the time-varying threshold signal, then spoofing or jamming is not detected.

Figure 1C:
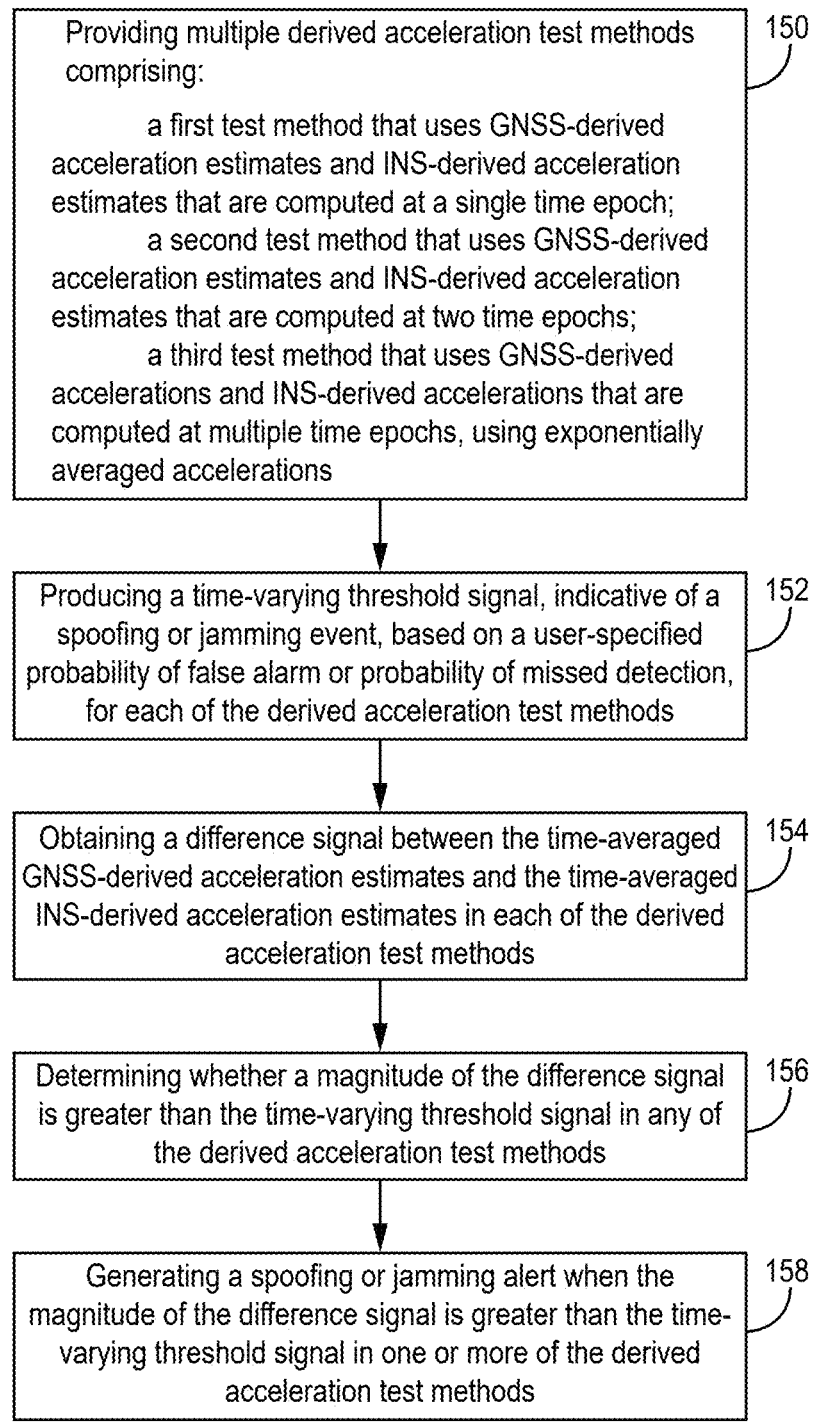
FIG. 1C is a flow diagram of another exemplary method performed by a spoofing or jamming detection module, such as in the system of FIG. 1A.

FIG. 1C is a flow diagram of a method that can be performed by spoofing or jamming detection module 130, according to another exemplary implementation. This method includes providing multiple derived acceleration test methods comprising a first test method that uses GNSS-derived acceleration estimates and INS-derived acceleration estimates that are computed at a single time epoch; a second test method that uses GNSS-derived acceleration estimates and INS-derived acceleration estimates that are computed at two time epochs; and a third test method that uses GNSS-derived accelerations and INS-derived accelerations that are computed at multiple time epochs, using exponentially averaged accelerations (block 150). This method also includes producing a time-varying threshold signal, indicative of a spoofing or jamming event, based on a user-specified probability of false alarm or probability of missed detection, for each of the derived acceleration test methods (block 152); and obtaining a difference signal between the time-averaged GNSS-derived acceleration estimates and the time-averaged INS-derived acceleration estimates in each of the derived acceleration test methods (block 154). This method further comprises determining whether a magnitude of the difference signal is greater than the time-varying threshold signal in any of the derived acceleration test methods (block 156); and generating a spoofing or jamming alert when the magnitude of the difference signal is greater than the time-varying threshold signal in one or more of the derived acceleration test methods (block 158).

Further details related to implementing the present approach are described in the following sections.

As described previously, the spoofing or jamming test has three components: 1) GNSS-derived acceleration; 2) INS-derived acceleration; and 3) the absolute value of the difference between the two derived accelerations, compared to a threshold. If the difference is less than or equal to the threshold, then no spoofing or jamming event is detected. If the difference is greater than the threshold, then a spoofing or jamming event is detected.

While the following sections describe further details on the detection of GPS spoofing or jamming, it should be understood that these details also apply to any GNSS constellation.

The time averaged spoofing or jamming test can be written as follows:

$$s(k) = a_{GPS}(k) - a_{INS}(k) \quad (1)$$

$$|s(k)| \le T(k)$$

where $a_{GPS} \equiv$ time averaged GPS – derived acceleration $a_{INS} \equiv$ time averaged INS – derived acceleration $s \equiv$ time averaged acceleration error $T \equiv$ user – specified threshold.

In this case, measurements at time epochs k−2, k−1, and k are used to compute the time averaged accelerations. If $|s(k)| \le T(k)$, then the GPS-derived acceleration is within the user-specified threshold of the INS-derived acceleration, the GPS-derived acceleration passes the spoofing or jamming test, and the GPS constellation is not spoofed or jammed. If $|s(k)| > T(k)$, then the GPS-derived acceleration is not within the user specified threshold of the INS-derived acceleration, the GPS-derived acceleration fails the spoofing or jamming test, and the GPS signals are spoofed or jammed.

The threshold, T, is selected as follows:

$$T = K\sqrt{\lambda^{P_s(k)}} \quad (2)$$

where $K = K_{MD}$ or $K_{FA}$ $K_{FA} \equiv$ false alert coefficient $= Q^{-1}(PFA)$ $K_{MD} \equiv$ missed detection coefficient $= Q^{-1}(PMD)$ $Q(x) = \int_{x}^{\infty} e^{-u^2/2} du$ $P_s(k) \equiv$ covariance of acceleration error, $s(k)$ $\lambda^{P_s(k)} \equiv$ maximum eigenvalue of $P_s(k)$.

The covariance of the acceleration error, $P_s(k)$, can be computed as follows:

$$P_s(k) = P_{GPS}(k) + P_{INS}(k) - 2P^{cross}_{GPS-INS}(k) \quad (3)$$

where $P_{GPS}(k) \equiv$ variance of the time averaged GPS-derived acceleration $P_{INS}(k) \equiv$ variance of the time averaged INS-derived acceleration $P^{cross}_{GPS-INS}(k) \equiv$ covariance between time averaged GPS-derived acceleration and time averaged INS-derived acceleration.

The exponentially averaged spoofing test can be written as follows:

$$s_{exp}(i) = a_{GPS,exp}(i) - a_{INS,exp}(i) \forall\ i = [k-j, k] \quad (4)$$

$$|s_{exp}(k)| \le T(k)$$

where
- $a_{GPS,exp}$≡exponentially averaged GPS-derived acceleration
- $a_{INS,exp}$≡exponentially averaged INS-derived acceleration
- $s_{exp}$≡exponentially averaged acceleration error
- j≡number of measurements used for exponentially moving average filter.

The exponentially averaged GPS-derived acceleration, and exponentially averaged INS-derived acceleration can be computed as follows:

$$a_{GPS,exp}(k) = \sum_{i=k-j+1}^{k}(1-\alpha_{GPS})a_{GPS,exp}(i-1) + \alpha_{GPS}a_{GPS,exp}(i) \quad (5)$$

where
$\alpha_{GPS}$≡user-selected weighting parameter; $0 \leq \alpha_{GPS} \leq 1$ $$a_{INS,exp}(k) = \sum_{i=k-j+1}^{k}(1-\alpha_{INS})a_{INS,exp}(i-1) + \alpha_{INS}a_{INS,exp}(i) \quad (6)$$

where
$\alpha_{INS}$≡user-selected weighting parameter; $0\alpha_{INS} \leq 1$.

Time-Differenced Carrier-Phase Method

The first step in the present approach is to use the difference between accumulated GNSS carrier phase measurements φ at consecutive time epochs to estimate velocity. For example, at time epoch j, multiply $\Delta\varphi = \varphi(j) - \varphi(j-1)$ by the carrier wavelength λ, to get the change in distance between the satellite and the GNSS antenna on the vehicle. For each satellite, the following equation applies:

$$\lambda \cdot \Delta\varphi = \Delta d + c\Delta\delta t_u + c\Delta\delta t_s + \text{(other terms)} \quad (7)$$

where $\Delta d = d(j) - d(j-1)$ and is the change in distance to the satellite, $\delta t_u$ is the receiver clock bias, and $\delta t_s$ is the satellite clock bias. The "other terms" on the right hand side of Equation (1) refer to atmospheric and clock terms, which are negligible if the measured carrier phase φ is adjusted using atmospheric corrections and satellite clock corrections. Using measurements from all available satellites, it is possible to estimate the change in aircraft position, $\Delta r_u = r_u(j) - r_u(j-1)$, by a least-squares method using the geometry matrix G(j).

When N satellites are in view of the GPS antenna, the N rows of the geometry matrix G(t) are the 4-vectors [e(t), 1], with e(t) being the unit vector from the vehicle antenna to the GNSS satellite in Earth-centered, Earth-fixed (ECEF) coordinates. Letting $r_s(j)$ denote the satellite position at time epoch j, the following pair of equations apply:

$$d(j) = e(j) * [r_s(j) - r_u(j)], \quad (8)$$

$$d(j-1) = e(j-1) * [r_s(j-1) - r_u(j-1)]$$

from which the following expression can be derived:

$$\lambda\Delta\varphi - \Delta D + \Delta g = -[e(j) * \Delta r_u] + c\Delta\delta t_u + \Delta\varepsilon \quad (9)$$

where $\Delta D$ and $\Delta g$ are computed at time epoch j from $r_u(j-1)$, $r_s(j-1)$, $r_s(j)$, $e(j-1)$, and $e(j)$. The system of N linear equations (9) is solved by using a least-squares approach to compute $\Delta r_u$. The estimate for average velocity at time epoch j is $v_u(j) = \Delta r_u(j)/\Delta t$. Finally, the estimate for average acceleration at time epoch j is $a(j) = \Delta v_u(j)/\Delta t$.

GNSS-Derived Acceleration Using TDCP: Δv-Spoof Test

The following is an example of how GNSS-derived acceleration vectors can be used, in comparison with INS-derived acceleration vectors, to detect GNSS spoofing or jamming that changes the true velocity by Δv in any units such as ft/sec.

Assume the nominal true trajectory is a constant-speed, constant altitude great-circle arc in ECEF, and that GNSS-derived accelerations are computed every Δt seconds, with Δt=1 sec. GNSS measurements at time epochs $t_1$, $t_2=t_1+\Delta t$, $t_3=t_1+2\Delta t$ are used to compute mean accelerations at time epochs $t_2$ and $t_3$. At some time t, between time epochs $t_1$ and $t_2$, a spoofer sends signals to the antenna of a target aircraft that would be true if the aircraft velocity at time t were v−Δv because the GNSS provided velocity now includes the spoofed signal Δv. If the change Δv is not too large, then the GNSS receiver's cycle-slip detector will not be triggered and a fake, growing GNSS-derived position error will influence the navigation filter's heading solution for the target aircraft, which will start to turn in the direction of the velocity vector v+Δv. The spoofer feeds signals to the antenna of a target aircraft consistent with a gradual return to the prior velocity of the aircraft v at time t, while the actual velocity of the aircraft approaches v+Δv at time epochs after time t.

GNSS-Derived Acceleration Estimates During the Spoof

The acceleration estimate at time epoch $t_3$ is an average acceleration $a_{s3} = (v_{s3} - v_{s2})/\Delta t$ computed from spoofed velocities $v_{s3} = (x_{s3} - x_{s2})/\Delta t$ & $v_{s2} = (x_{s2} - x_1)/\Delta t$ at time epochs $t_3$ & $t_2$. Position measurement $x_1$ was provided before the spoofing event, therefore, there is no "s". As a function of the spoofed velocity change Δv at time t, the following can be computed:

$$x_{s2} = x_1 + (t - t_1)v + (t_2 - t)(v + \Delta v), \ x_{s3} = x_{s2} + (v + \Delta v)\Delta t \quad (10)$$

so $$v_{s2} = v + \frac{t_2 - t}{\Delta t}(\Delta v), \ v_{s3} = (v + \Delta v), \text{ and so } a_{s3} = \frac{t - t_1}{\Delta t^2}(\Delta v). \quad (11)$$

Since $v_1 \approx v$, $$a_{s2} \approx \frac{t_2 - t}{\Delta t^2}(\Delta v)$$

and so, in particular, $$a_{s2} + a_{s3} \approx \frac{\Delta v}{\Delta t}. \quad (12)$$

Equation (12) for the sum of two consecutive GNSS-derived acceleration estimates will be used in the test for a single Δv spoof.

Standard Deviations of Components of GNSS-Derived Acceleration Estimates

There is an analytic formula for the 1-σ errors in acceleration components estimated from GNSS signals. It depends on the phase-error $\sigma_p$ and the pseudo-inverse of the geometry matrix at time epoch j. For example, let acc_NED denote the GNSS-derived acceleration at time epoch j, rotated into NED coordinates. Let G_psinv denote the pseudoinverse matrix. Then, the GNSS-derived acceleration reduces to:

$$\text{acc\_NED}(j) = \text{G\_psinv} * (\text{data\_vec}(j, j-1, j-2) + \text{noise}_j). \quad (13)$$

where $$\text{noise}_j = \varepsilon_j - 2\varepsilon_{(j-1)} + \varepsilon_{(j-2)},$$

which is a sum of three vectors of Gaussian, independent variables, with each $\varepsilon$ having a standard deviation of $\sigma_p$. Therefore, each acceleration noise component has standard deviation $\sigma = \sqrt{6}\, \sigma_p$ (14).

In addition, let $g_N$, $g_E$, $g_D$ denote the rows of G_psinv corresponding to the North, East, and Down components of acceleration. Then the standard deviations of the GNSS-derived accelerations are $\text{acc\_N}(j)=\sqrt{6}\|g_N\|\sigma_p$, $\text{acc\_E}(j)=\sqrt{6}\|g_E\|\sigma_p$, and $\text{acc\_D}(j)=\sqrt{6}\|g_D\|\sigma_p$ (15).

Standard Deviations for Components of the Sums of GNSS-Derived Acceleration Estimates The standard deviations of the sums of two consecutive GNSS-derived accelerations can be computed as:

$$\text{acc\_NED}(j) + \text{acc\_NED}(j+1) = \text{G\_psinv} * \quad (16)$$

$$(\text{data\_vec}(j, j-1, j-2) + \text{data\_vec}(j+1, j, j-1) + \text{noise}_j + \text{noise}_{j+1})$$

where $\text{noise}_j + \text{noise}_{j+1} = \varepsilon_{(j+1)} - \varepsilon_j - \varepsilon_{(j-2)} + \varepsilon_{(j-2)}$ (17) is a sum of four vectors of Gaussian, independent random variables each having standard deviation of $\sigma_p$. Each summed component acceleration noise, $\text{noise}_j + \text{noise}_{j+1}$, has standard deviation $\sigma = 2\sigma_p$ (18). This derivation of standard deviation is less than the $\sigma$ of $\text{noise}_j$ given in Equation (14) by about 20%.

Again let $g_N$, $g_E$, & $g_D$, denote the rows of G_psinv corresponding to the N, E, and D components of GNSS-derived acceleration. Then the standard deviation of $\text{acc\_N}(j) + \text{acc\_N}(j+1) = 2\|g_N\|\sigma_p$, $\text{acc\_E}(j) + \text{acc\_E}(j+1) = 2\|g_E\|\sigma_p$, and $\text{acc\_D}(j) + \text{acc\_D}(j+1) = 2\|g_D\|\sigma_p$ (19). The instantaneous change in velocity from GNSS generally produces changes in average acceleration over two consecutive time periods, as seen above. Equation (19) provides the spoofing test with the standard deviations of these sums of average GNSS-derived accelerations.

By Equation (12) above, since the average GNSS-derived accelerations are $\text{acc\_NED}(j) = \Delta v*(t_j-t)/\Delta t$ and $\text{acc\_NED}(j+1) = \Delta v*(t-t_{j-1})/\Delta t$, then $\text{acc\_NED}(j) + \text{acc\_NED}(j+1) = \Delta v/\Delta t$.

Direct Spoofing or Jamming Test: Time-Varying Threshold

In this example, a spoofing or jamming test has PFA< 1e−4/hour. The three components of GNSS-derived acceleration, $\text{acc\_NED}(j) + \text{acc\_NED}(j+1)$, are used in the spoofing or jamming test. In Equation (1), $a_{GPS}(j+1) = \text{acc\_NED}(j) + \text{acc\_NED}(j+1)$ and $a_{INS}(j+1) = \text{acc\_INS}(j) + \text{acc\_INS}(j+1)$. The spoofing test is performed at the GNSS measurement time—in this case once a second. The threshold vector $\Delta v_T$ must be selected to provide the desired integrity and, therefore, the spoofing alarm must trigger when the magnitude of one of the three components of $\text{acc\_NED}(j) + \text{acc\_NED}(j+1)$ exceeds that of the threshold $\Delta v_T/\Delta t = \Delta v_T$ for $\Delta t = 1$ sec.

For example, the standard deviation of the North component of the GNSS-derived acceleration is $\sigma(\text{acc\_N}(j) + \text{acc\_N}(j+1)) = 2\|g_N\|\sigma_p$. Because both G_psinv and $\sigma_p$ are time-varying (because the elevation angle of the GNSS satellite changes above the horizon as the satellite orbits the Earth), the threshold vector (j) will depend on time. In 10^4 hours, 1.08e^8 tests (3 GNSS-derived acceleration components/sec×60 sec/min×60 min/hour×10^4 hour) are performed to determine if the GNSS signals are spoofed. If the N-component of $\Delta v_T(j) = 5.75*\sigma(\text{acc\_N}(j) + \text{acc\_N}(j-1)) = 11.5\|g_N(j)\|\sigma_p(j)$ is selected (similarly for E and D), then the false alarm objective will be met because a 5.75-$\sigma$ event is expected to occur only once every 1.12e^8 trials.

To summarize, the spoofing or jamming test given above in Equation (1) can be used with GNSS-derived accelerations and INS-derived accelerations in three time-averaged acceleration test methods using different time periods. In the first test method, the spoofing or jamming test can be used with GNSS-derived accelerations and INS-derived accelerations computed at a single time epoch. In the second test method, the spoofing or jamming test can be used with GNSS-derived accelerations and INS-derived accelerations computed at two time epochs. In the third test method, the spoofing or jamming test can be used with GNSS-derived accelerations and INS-derived accelerations computed at multiple time epochs, using exponentially averaged accelerations. If any of these three test methods fail, then the GNSS signals are spoofed.

Parameter Values for Simulation Example

Figure 2:
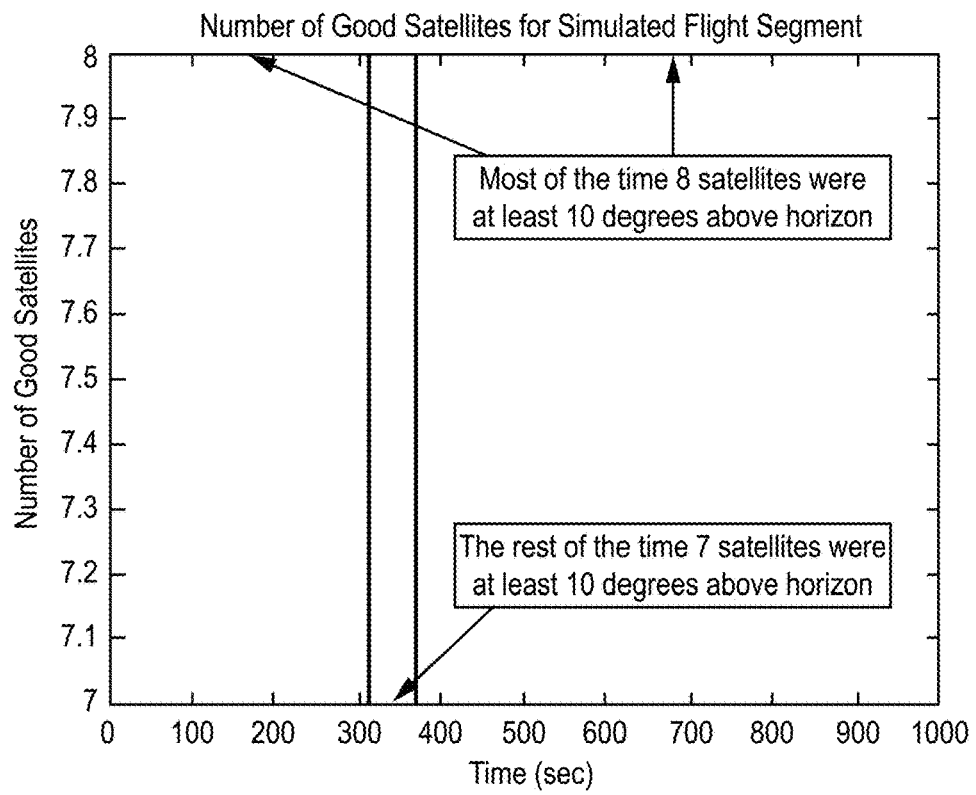
FIG. 2 is a graph showing the number of good satellites for a simulated flight segment.
Figure 3A:
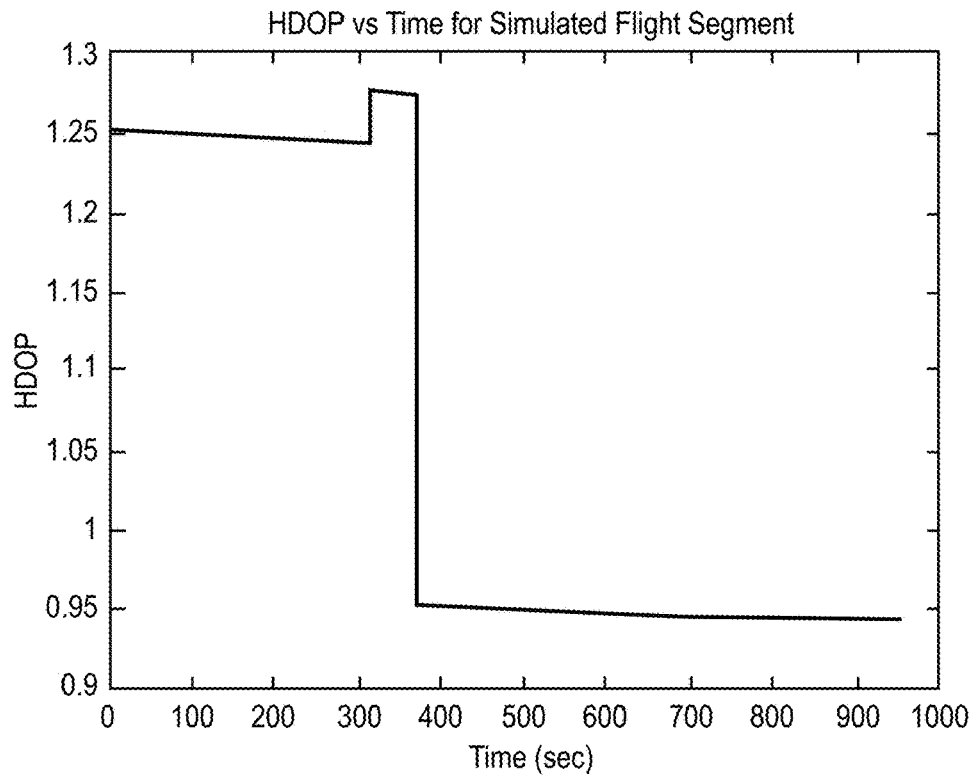
FIG. 3A is a graph of the values of horizontal dilution of precision (HDOP) for the simulated flight segment.
Figure 3B:
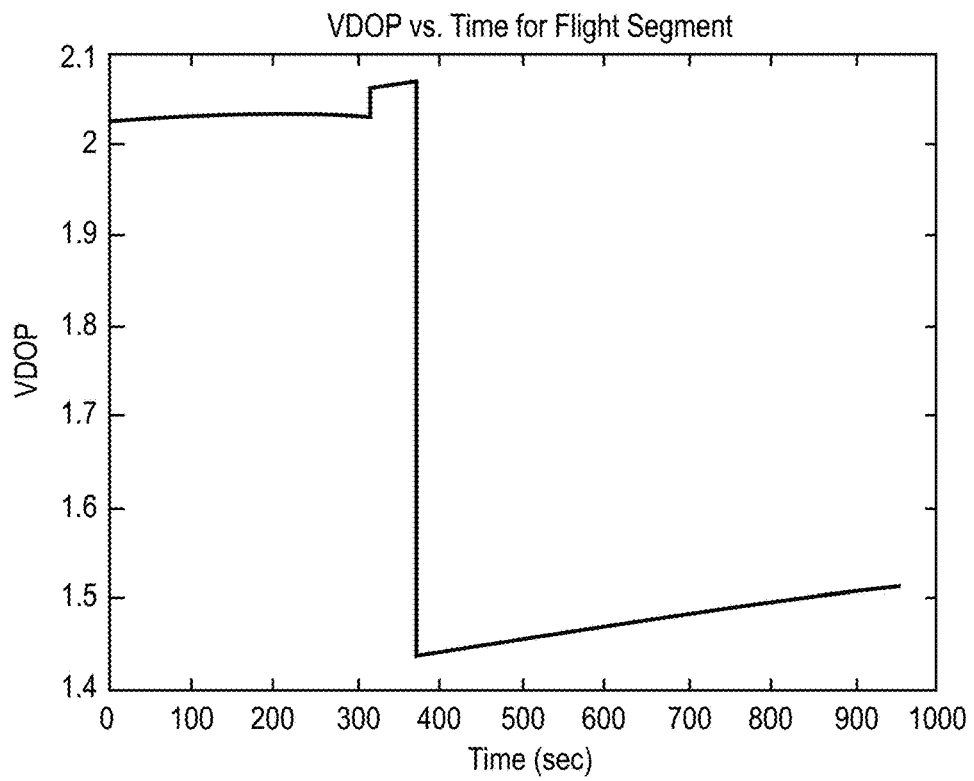
FIG. 3B is a graph of the values of vertical dilution of precision (VDOP) for the simulated flight segment.

A simulation of roughly 15 minutes of flight (flight segment) was run to illustrate the present approach. The aircraft speed was 245 meters/sec, and its altitude was 12 km. The simulated flight segment was selected for a long simulated flight that started from Chicago (ORD) and ended in Hong Kong (HGK). The number of good satellites for the simulated flight segment is represented in the graph of FIG. 2. The number of satellites above the 10 degree horizon mask angle for the first 15 minutes started at 8, dropped to 7, then returned to 8, as shown in FIG. 2. With respect to the satellite geometry, the values of horizontal dilution of precision (HDOP) ranged from 1.3 to 0.9, as shown in the graph of FIG. 3A, and the values of vertical dilution of precision (VDOP) varied from 2.1 to 1.4, as shown in the graph of FIG. 3B.

The simulated sensor noise levels (GNSS-derived acceleration—averaged INS-derived acceleration—gravity) with time-varying 5.75-sigma threshold bounds (spoofing threshold levels) for the Down component are shown in the section that follows.

Accelerometer Noise and Other Errors

Errors in the INS-derived acceleration are caused by accelerometer measurement errors, misalignment of measurement axes, or pitch and roll errors introduced by leveling the accelerometer measurements. Most inertial-grade IMUs have 2-$\sigma$ accelerometer noise errors less than 0.01 Gs≈0.0981 meters/sec^2 at 25 Hz to 50 Hz. At 25 Hz, the accelerometer white noise 1-$\sigma$ standard deviation is approximately 0.02 meters/sec$^2$ per accelerometer. The pitch and roll angles can have 2-$\sigma$ noise errors of approximately 0.10°. A Down direction accelerometer misalignment of 0.1° results in North or East gravity components of acceleration of approximately 0.0017 G or 0.017 m/sec$^2$. A 5.75-$\sigma$ noise level is close to 0.05 m/sec$^2$. The Down component of acceleration is much less sensitive to attitude error. A 1° pitch error causes an error of about 0.0015 m/sec$^2$ in the Down components of acceleration. Pitch and roll angle 2-$\sigma$ errors are 0.1° for an inertial grade IMU, so a 5.75-σ effect on the Down-component leads to a threshold of <0.001 m/sec².

However, the acceleration due to gravity does vary from place to place. The force of gravity at the Earth's surface varies from 9.78 meters/sec² at the equator to 9.83 meters/sec² at the poles. For this reason, a gravity disturbance correction model might be useful to keep the mean value of the Down component of INS-derived acceleration within 0.01 meter/sec² of measured values.

GNSS Noise Used in Examples

In the examples shown in the graphs of FIGS. 4-8, a value of $\sigma_p=2$ mm was used for the 1-σ phase measurement errors of the GPS receiver. No adjustment was made for satellite elevation angle.

Figure 4:
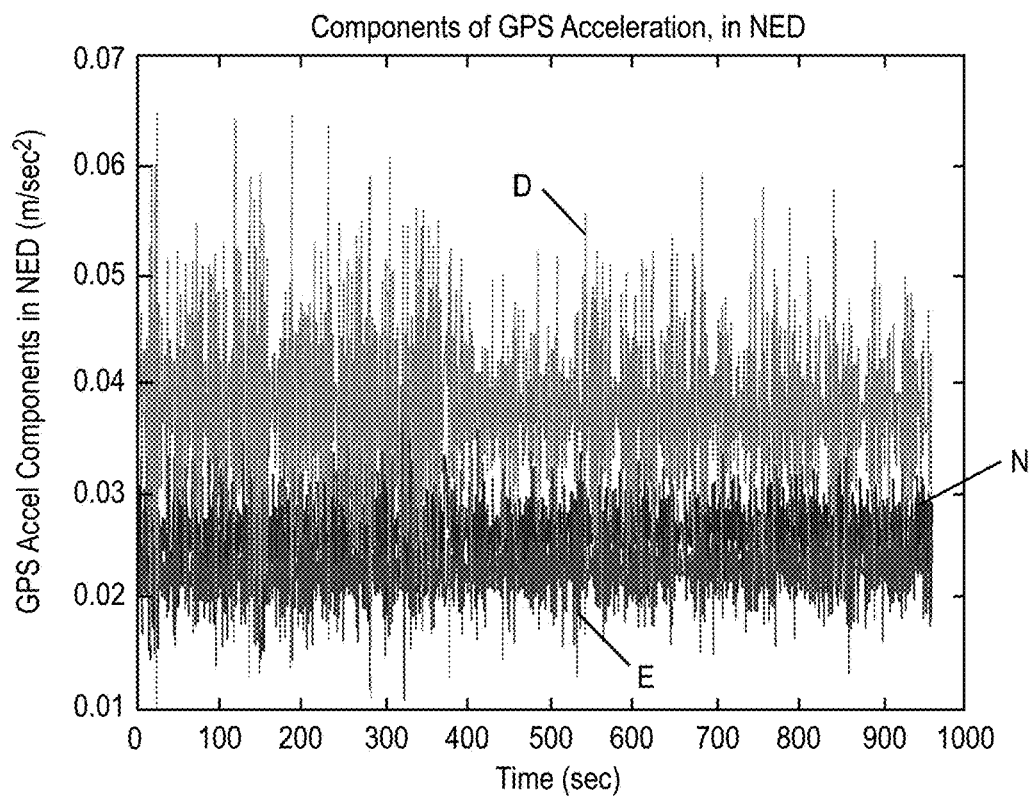
FIG. 4 is a graph of GPS-derived acceleration components in the North-East-Down (NED) frame.
Figure 5:
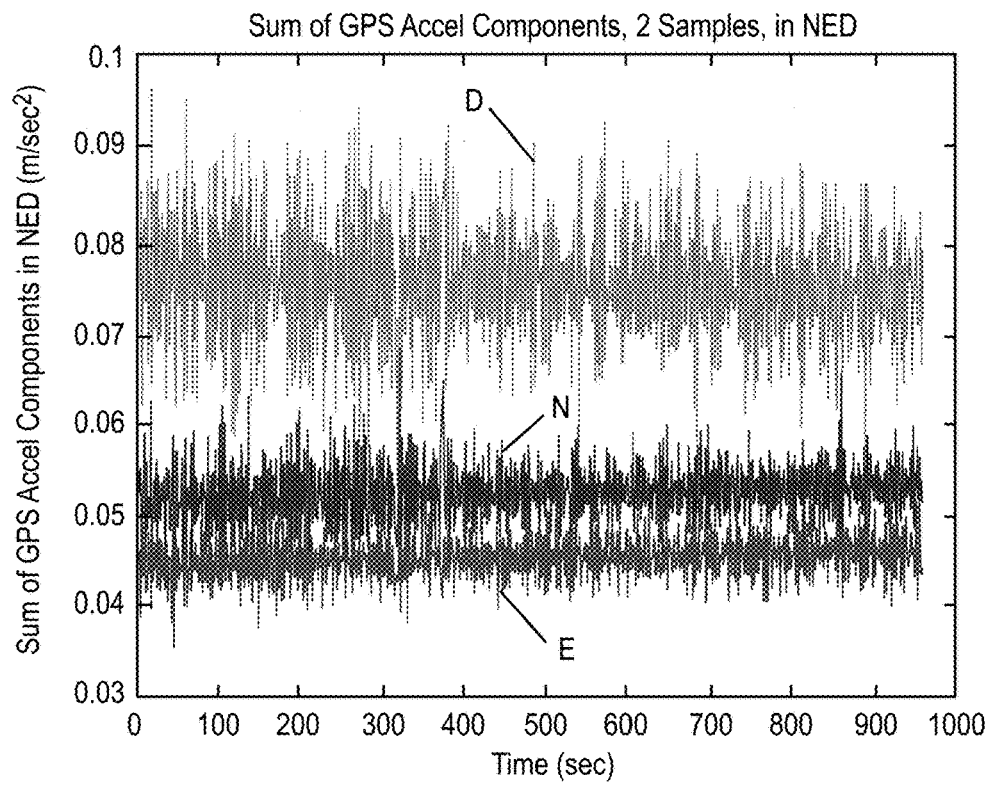
FIG. 5 is a graph of the sum of GPS-derived acceleration components in the NED frame for two samples.
Figure 6:
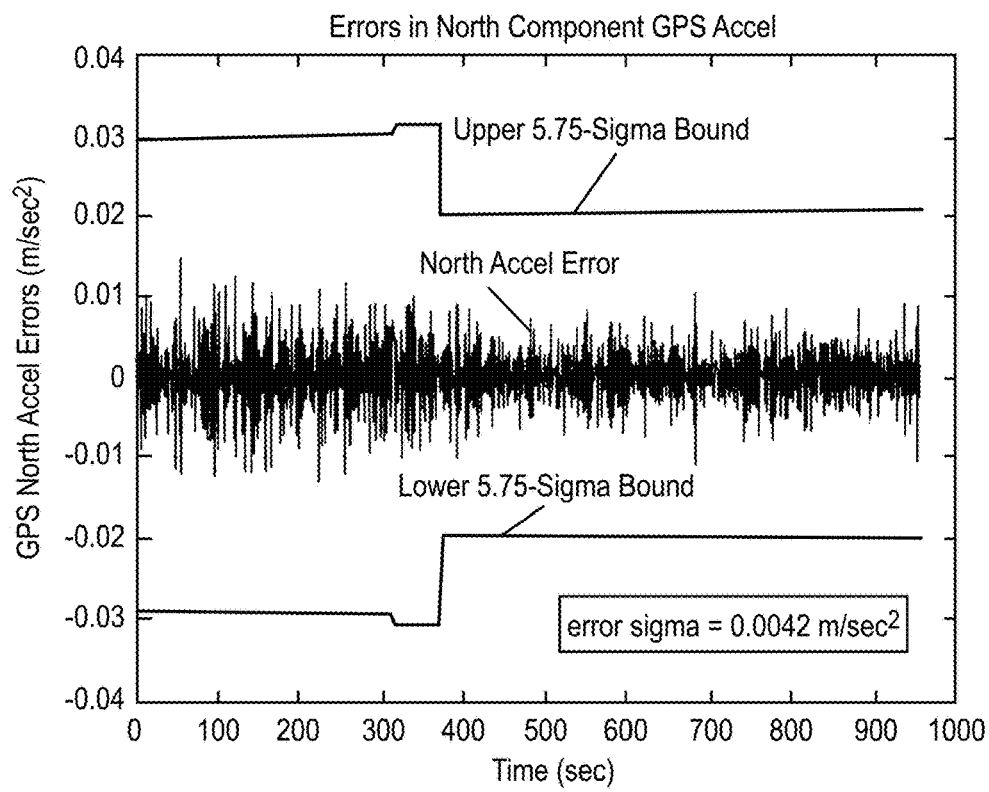
FIG. 6 is a graph of the errors in the North component of GPS-derived acceleration.
Figure 7:
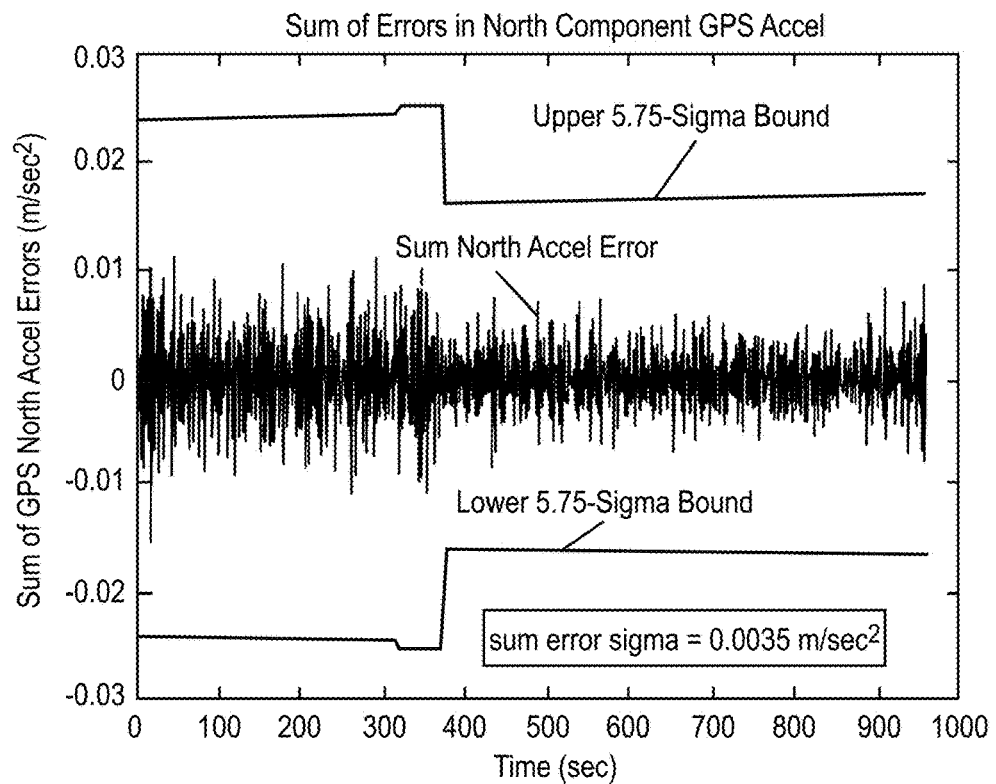
FIG. 7 is a graph of the sum of errors in the North component of GPS-derived acceleration for two samples.

FIG. 4 is a graph of GPS-derived acceleration components in the NED frame, and FIG. 5 is a graph of the sum of GPS-derived acceleration components in the NED frame for two samples. FIG. 6 is a graph of the errors in the North component of GPS-derived acceleration, and FIG. 7 is a graph of the sum of errors in the North component of GPS-derived acceleration for two samples.

Figure 8:
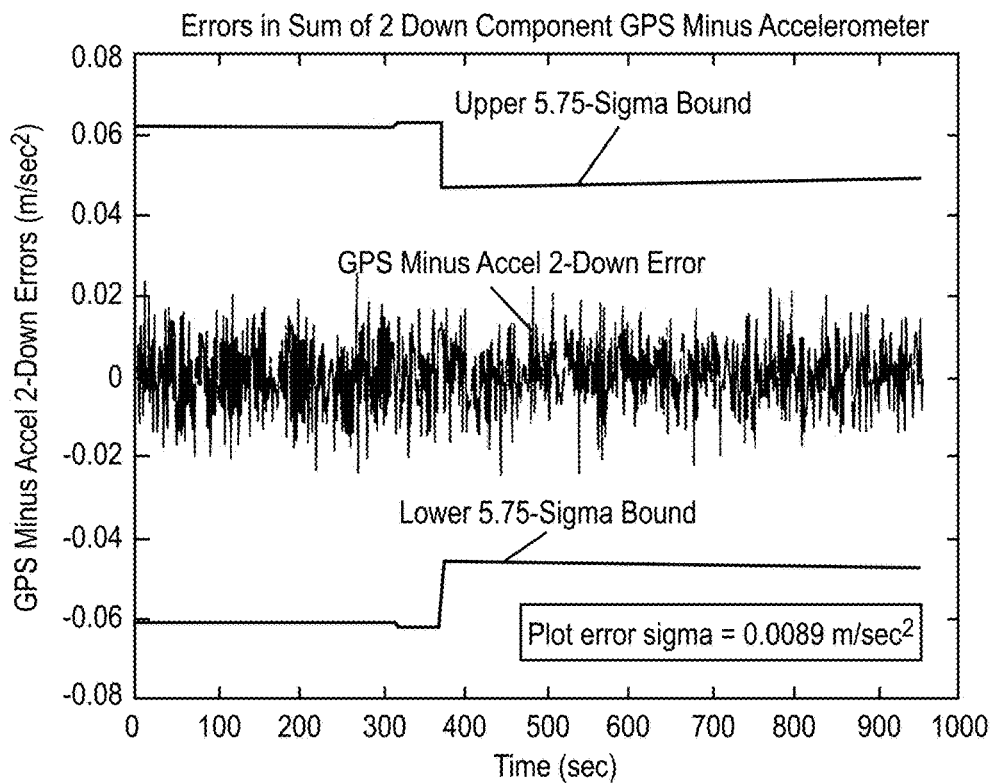
FIG. 8 is a graph of the errors in the sum of two Down components of GPS-derived acceleration minus a time-averaged INS-derived acceleration.

FIG. 8 is a graph of the errors in the sum of two Down components of GPS-derived acceleration minus a time-averaged INS-derived acceleration. The plot of FIG. 8 accounts for GPS carrier-phase error $\sigma_p=2$ mm, accelerometer 1-σ error 0.01 G's at 25 Hz, and 2-σ pitch/roll errors of 0.1°. The errors shown in the Down-component do account for the gravity misalignment error mentioned previously, which is negligible in the Down component case. Note that the 5.75-σ nominal threshold varies with satellite DOP (geometry) as well as elevation angles above the horizon.

Comparing the ECEF Data with Accelerometer Output

Accelerations in Earth-centered inertial (ECI) coordinates can be resolved into ECEF (x is in ECEF) coordinates using the formula:

$$accel_{ECEF}^{ECI} = \begin{bmatrix} -\omega^2 x_1(t) + 2\omega \dot{x}_2(t) + \ddot{x}_1(t) \\ -\omega^2 x_2(t) - 2\omega \dot{x}_1(t) + \ddot{x}_2(t) \\ \ddot{x}_3(t) \end{bmatrix} \quad (20)$$

where the Earth's rotation rate is $\omega=7.29\times10^{-5}$ rad/sec. For spoofing or jamming detection, the estimated ECEF kinematic quantities x(t), ẋ(t) and ẍ(t) given in Equation (15) are subtracted from the INS-derived kinematic components in ECEF coordinates (with a gravity correction) and compared to a time-varying threshold.

The processing units and/or other computational devices used in the method and system described herein may be implemented using software, firmware, hardware, or appropriate combinations thereof. The processing unit and/or other computational devices may be supplemented by, or incorporated in, specially designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a system to detect spoofing or jamming of global navigation satellite system (GNSS) signals, the system comprising: a GNSS receiver onboard a vehicle; an inertial navigation system (INS) onboard the vehicle; an inertial measurement unit (IMU) operatively coupled to the INS, the IMU operative to produce inertial measurements that are sent to the INS; at least one processor onboard the vehicle, the at least one processor operative to receive data outputs from the GNSS receiver and the INS, the at least one processor operative to execute processor readable instructions to perform a spoofing or jamming test comprising providing multiple derived acceleration test methods comprising: a first test method that uses GNSS-derived acceleration estimates and INS-derived acceleration estimates that are computed at a single time epoch; a second test method that uses GNSS-derived acceleration estimates and INS-derived acceleration estimates that are computed at two time epochs; and a third test method that uses GNSS-derived accelerations and INS-derived accelerations that are computed at multiple time epochs, using exponentially averaged accelerations; producing a time-varying threshold signal, indicative of a spoofing or jamming event, based on a user-specified probability of false alarm or probability of missed detection, for each of the derived acceleration test methods; obtaining a difference signal between the time-averaged GNSS-derived acceleration estimates and the time-averaged INS-derived acceleration estimates in each of the derived acceleration test methods; determining whether a magnitude of the difference signal is greater than the time-varying threshold signal in any of the derived acceleration test methods; and generating a spoofing or jamming alert when the magnitude of the difference signal is greater than the time-varying threshold signal in one or more of derived acceleration test methods.

Example 2 includes the system of Example 1, wherein the first test method further comprises: computing a time-averaged GNSS-derived acceleration estimate for the vehicle based on time-differenced carrier phase (TDCP) measurements received from the GNSS receiver, wherein the time-averaged GNSS-derived acceleration estimate is computed at the single time epoch; computing a time-averaged INS-derived acceleration estimate for the vehicle, based on inertial measurements from the IMU that are received by the INS; wherein the time-averaged INS-derived acceleration estimate is computed at the single time epoch; obtaining a first difference signal between the time-averaged GNSS-derived acceleration estimate and the time-averaged INS-derived acceleration estimate at the single time epoch; and determining whether a magnitude of the first difference signal is greater than the time-varying threshold at the single time epoch.

Example 3 includes the system of any of Examples 1-2, wherein the second test method further comprises computing a time-averaged GNSS-derived acceleration estimate for the vehicle based on TDCP measurements received from the GNSS receiver, wherein the time-averaged GNSS-derived acceleration estimate is computed at the two time epochs; computing a time-averaged INS-derived acceleration estimate for the vehicle, based on inertial measurements from the IMU that are received by the INS, wherein the time-averaged INS-derived acceleration estimate is computed at the two time epochs; obtaining a second difference signal between the time-averaged GNSS-derived acceleration estimate and the time-averaged INS-derived acceleration estimate at the two time epochs; and determining whether a magnitude of the second difference signal is greater than the time-varying threshold at the two time epochs.

Example 4 includes the system of any of Examples 1-3, wherein the third test method further comprises: computing a time-averaged GNSS-derived acceleration estimate for the vehicle based on TDCP measurements received from the GNSS receiver, wherein the time-averaged GNSS-derived acceleration estimate is computed at the multiple time epochs, using exponentially averaged accelerations; computing a time-averaged INS-derived acceleration estimate for the vehicle, based on inertial measurements from the IMU that are received by the INS, wherein the time-averaged INS-derived acceleration estimate is computed at the multiple time epochs, using exponentially averaged accelerations; obtaining a third difference signal between the time-averaged GNSS-derived acceleration estimate and the time-averaged INS-derived acceleration estimate at the multiple time epochs; and determining whether a magnitude of the third difference signal is greater than the time-varying threshold at the multiple time epochs.

Example 5 includes the system of any of Examples 1-4, wherein a false alarm rate is less than the user-specified probability of false alarm.

Example 6 includes the system of any of Examples 1-5, wherein if the magnitude of the difference signal is less than or equal to the time-varying threshold signal, then spoofing or jamming is not detected.

Example 7 includes the system of any of Examples 1-6, wherein the GNSS receiver is operative to receive satellite signals from a GNSS constellation, and to generate TDCP measurements.

Example 8 includes the system of any of Examples 1-7, wherein the inertial measurements include accelerometer and gyroscope measurements.

Example 9 includes the system of any of Examples 1-8, wherein the INS is configured to generate estimated kinematic state statistics for the vehicle based on the inertial measurements.

Example 10 includes the system of any of Examples 1-9, wherein the processor readable instructions are located in a spoofing or jamming detection module hosted by the at least one processor.

Example 11 includes the system of any of Examples 1-10, wherein the vehicle is an aircraft.

Example 12 includes the system of any of Examples 1-11, wherein the vehicle is a manned aircraft, an unmanned aircraft systems (UAS) vehicle, or an urban air mobility (UAM) vehicle.

Example 13 includes a method to detect spoofing or jamming of global navigation satellite system (GNSS) signals, the method comprising: providing a GNSS receiver and an inertial navigation system (INS) onboard a vehicle, wherein an inertial measurement unit (IMU) is coupled to the INS and sends inertial measurements of the vehicle to the INS; receiving data outputs from the GNSS receiver and the INS in a processor, wherein the processor performs a spoofing or jamming test comprising: computing a time-averaged GNSS-derived acceleration estimate for the vehicle based on time-differenced carrier phase (TDCP) measurements received from the GNSS receiver; computing a time-averaged INS-derived acceleration estimate for the vehicle based on inertial measurements from the IMU that are received by the INS; producing a time-varying threshold signal, indicative of a spoofing or jamming event, based on a user-specified probability of false alarm or probability of missed detection; obtaining a difference signal between the time-averaged GNSS-derived acceleration estimate and the time-averaged INS-derived acceleration estimate; determining whether a magnitude of the difference signal is greater than the time-varying threshold signal; and generating a spoofing or jamming alert when the magnitude of the difference signal is greater than the time-varying threshold signal.

Example 14 includes the method of Examples 13, wherein if the magnitude of the difference signal is less than or equal to the time-varying threshold signal, then spoofing or jamming is not detected.

Example 15 includes the method of any of Examples 13-14, wherein the GNSS receiver receives satellite signals from a GNSS constellation, and generates the TDCP measurements.

Example 16 includes the method of any of Examples 13-15, wherein the inertial measurements include accelerometer and gyroscope measurements.

Example 17 includes the method of any of Examples 13-16, wherein the INS generates estimated kinematic state statistics for the vehicle based on the inertial measurements.

Example 18 includes the method of any of Examples 13-17, wherein the spoofing or jamming test further includes an exponentially weighted moving average test.

Example 19 includes the method of any of Examples 13-18, wherein the vehicle is an aircraft.

Example 20 includes the method of any of Examples 13-19, wherein the vehicle is a manned aircraft, an unmanned aircraft systems (UAS) vehicle, or an urban air mobility (UAM) vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system to detect spoofing or jamming of global navigation satellite system (GNSS) signals, the system comprising:
a GNSS receiver onboard a vehicle;
an inertial navigation system (INS) onboard the vehicle;
an inertial measurement unit (IMU) operatively coupled to the INS, the IMU operative to produce inertial measurements that are sent to the INS;
at least one processor onboard the vehicle, the at least one processor operative to receive data outputs from the GNSS receiver and the INS, the at least one processor operative to execute processor readable instructions to perform a time-averaged spoofing or jamming test comprising:
providing multiple derived acceleration test methods comprising:
a first test method that uses GNSS-derived acceleration estimates and INS-derived acceleration estimates that are computed at a single time epoch;
a second test method that uses GNSS-derived acceleration estimates and INS-derived acceleration estimates that are computed at two time epochs; and
a third test method that uses GNSS-derived accelerations and INS-derived accelerations that are computed at multiple time epochs, using exponentially averaged accelerations;
producing a time-varying threshold signal, indicative of a spoofing or jamming event, based on at least a user-specified probability of missed detection, for each of the derived acceleration test methods;
obtaining a difference signal between time-averaged GNSS-derived acceleration estimates and time-averaged INS-derived acceleration estimates in each of the derived acceleration test methods;
determining whether a magnitude of the difference signal is greater than the time-varying threshold signal in any of the derived acceleration test methods; and
generating a spoofing or jamming alert when the magnitude of the difference signal is greater than the time-varying threshold signal in one or more of the derived acceleration test methods;
wherein real-time computations of time-varying 1-sigma noise statistics of the time-averaged GNSS-derived acceleration estimates for each of the derived acceleration test methods are performed;
wherein the real-time computations of the time-varying 1-sigma noise statistics of the time-averaged GNSS-derived acceleration estimates depends on GNSS satellite geometry and the GNSS receiver; and
wherein the time-varying threshold signal for each of the derived acceleration test methods is computed using the time-varying 1-sigma noise statistics of the time-averaged GNSS-derived acceleration estimates, time-varying 1-sigma noise statistics of the time-averaged INS-derived acceleration estimates, and the probability of missed detection.

2. The system of claim 1, wherein the first test method further comprises:
computing a time-averaged GNSS-derived acceleration estimate for the vehicle based on time-differenced carrier phase (TDCP) measurements received from the GNSS receiver, wherein the time-averaged GNSS-derived acceleration estimate is computed at the single time epoch;
computing a time-averaged INS-derived acceleration estimate for the vehicle, based on inertial measurements from the IMU that are received by the INS, wherein the time-averaged INS-derived acceleration estimate is computed at the single time epoch;
obtaining a first difference signal between the time-averaged GNSS-derived acceleration estimate and the time-averaged INS-derived acceleration estimate at the single time epoch; and
determining whether a magnitude of the first difference signal is greater than the time-varying threshold at the single time epoch.

3. The system of claim 1, wherein the second test method further comprises:
computing a time-averaged GNSS-derived acceleration estimate for the vehicle based on TDCP measurements received from the GNSS receiver, wherein the time-averaged GNSS-derived acceleration estimate is computed at the two time epochs;
computing a time-averaged INS-derived acceleration estimate for the vehicle, based on inertial measurements from the IMU that are received by the INS, wherein the time-averaged INS-derived acceleration estimate is computed at the two time epochs;
obtaining a second difference signal between the time-averaged GNSS-derived acceleration estimate and the time-averaged INS-derived acceleration estimate at the two time epochs; and
determining whether a magnitude of the second difference signal is greater than the time-varying threshold at the two time epochs.

4. The system of claim 1, wherein the third test method further comprises:
computing a time-averaged GNSS-derived acceleration estimate for the vehicle based on TDCP measurements received from the GNSS receiver, wherein the time-averaged GNSS-derived acceleration estimate is computed at the multiple time epochs, using exponentially averaged accelerations;
computing a time-averaged INS-derived acceleration estimate for the vehicle, based on inertial measurements from the IMU that are received by the INS, wherein the time-averaged INS-derived acceleration estimate is computed at the multiple time epochs, using exponentially averaged accelerations;
obtaining a third difference signal between the time-averaged GNSS-derived acceleration estimate and the time-averaged INS-derived acceleration estimate at the multiple time epochs; and
determining whether a magnitude of the third difference signal is greater than the time-varying threshold at the multiple time epochs.

5. The system of claim 1, wherein:
producing the time-varying threshold signal is further based on a user-specified probability of false alarm; and
a false alarm rate is less than the user-specified probability of false alarm.

6. The system of claim 1, wherein if the magnitude of the difference signal is less than or equal to the time-varying threshold signal, then spoofing or jamming is not detected.

7. The system of claim 1, wherein the GNSS receiver is operative to receive satellite signals from a GNSS constellation, and to generate TDCP measurements.

8. The system of claim 1, wherein the inertial measurements include accelerometer and gyroscope measurements.

9. The system of claim 1, wherein the INS is configured to generate estimated kinematic state statistics for the vehicle based on the inertial measurements.

10. The system of claim 1, wherein the processor readable instructions are located in a spoofing or jamming detection module hosted by the at least one processor.

11. The system of claim 1, wherein the vehicle is an aircraft.

12. The system of claim 1, wherein the vehicle is a manned aircraft, an unmanned aircraft systems (UAS) vehicle, or an urban air mobility (UAM) vehicle.

13. A method to detect spoofing or jamming of global navigation satellite system (GNSS) signals, the method comprising:
  providing a GNSS receiver and an inertial navigation system (INS) onboard a vehicle, wherein an inertial measurement unit (IMU) is coupled to the INS and sends inertial measurements of the vehicle to the INS;
  receiving data outputs from the GNSS receiver and the INS in a processor, wherein the processor performs a time-averaged spoofing or jamming test comprising:
    computing a time-averaged GNSS-derived acceleration estimate for the vehicle based on time-differenced carrier phase (TDCP) measurements received from the GNSS receiver;
    computing a time-averaged INS-derived acceleration estimate for the vehicle based on inertial measurements from the IMU that are received by the INS;
    producing a time-varying threshold signal, indicative of a spoofing or jamming event, based on at least a user-specified probability of missed detection;
    obtaining a difference signal between the time-averaged GNSS-derived acceleration estimate and the time-averaged INS-derived acceleration estimate;
    determining whether a magnitude of the difference signal is greater than the time-varying threshold signal; and
    generating a spoofing or jamming alert when the magnitude of the difference signal is greater than the time-varying threshold signal;
  wherein real-time computations of time-varying 1-sigma noise statistics of the time-averaged GNSS-derived acceleration estimate is performed;
  wherein the real-time computations of the time-varying 1-sigma noise statistics of the time-averaged GNSS-derived acceleration estimate depends on GNSS satellite geometry and the GNSS receiver; and
  wherein the time-varying threshold signal is computed using the time-varying 1-sigma noise statistics of the time-averaged GNSS-derived acceleration estimate, time-varying 1-sigma noise statistics of the time-averaged INS-derived acceleration estimate, and the probability of missed detection.

14. The method of claim 13, wherein if the magnitude of the difference signal is less than or equal to the time-varying threshold signal, then spoofing or jamming is not detected.

15. The method of claim 13, wherein the GNSS receiver receives satellite signals from a GNSS constellation, and generates the TDCP measurements.

16. The method of claim 13, wherein the inertial measurements include accelerometer and gyroscope measurements.

17. The method of claim 13, wherein the INS generates estimated kinematic state statistics for the vehicle based on the inertial measurements.

18. The method of claim 13, wherein:
  producing the time-varying threshold signal is further based on a user-specified probability of false alarm; and
  the spoofing or jamming test further includes an exponentially weighted moving average test.

19. The method of claim 13, wherein the vehicle is an aircraft.

20. The method of claim 13, wherein the vehicle is a manned aircraft, an unmanned aircraft systems (UAS) vehicle, or an urban air mobility (UAM) vehicle.

* * * * *